(12) United States Patent
Yang et al.

(10) Patent No.: US 9,730,018 B2
(45) Date of Patent: *Aug. 8, 2017

(54) INTELLIGENT GUIDING METHOD AND SYSTEM BASED ON M2M SYSTEM

(71) Applicant: ZTE Corporation, Shenzhen (CN)

(72) Inventors: Kun Yang, Shenzhen (CN); Chuanxi Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/442,197

(22) Filed: Feb. 24, 2017

(65) Prior Publication Data

US 2017/0171708 A1    Jun. 15, 2017

Related U.S. Application Data

(63) Continuation of application No. 14/904,599, filed as application No. PCT/CN2013/085062 on Oct. 11, 2013, now Pat. No. 9,622,034.

(30) Foreign Application Priority Data

Jul. 19, 2013    (CN) .......................... 2013 1 0307410

(51) Int. Cl.
*H04W 4/02*    (2009.01)
*H04L 29/08*    (2006.01)
(Continued)

(52) U.S. Cl.
CPC ........... *H04W 4/021* (2013.01); *H04W 4/005* (2013.01); *H04W 4/043* (2013.01); *H04W 12/02* (2013.01); *H04W 12/06* (2013.01); *H04W 60/00* (2013.01)

(58) Field of Classification Search
CPC ..... H04W 4/021; H04W 4/005; H04W 12/06; H04W 12/02; H04W 4/043; H04W 60/00
(Continued)

(56) References Cited

U.S. PATENT DOCUMENTS 6,898,631 B1 *   5/2005   Kraft ................... H04L 12/1831
                                            379/1.03
8,055,275 B2    11/2011   Duan
(Continued)

FOREIGN PATENT DOCUMENTS

CN           1794771 A      6/2006
CN         101430766 A      5/2009
(Continued)

OTHER PUBLICATIONS

International Search Report in international application No. PCT/CN2013/085062, mailed on Apr. 30, 2014.
(Continued)

*Primary Examiner* — Sharad Rampuria
(74) *Attorney, Agent, or Firm* — Oppedahl Patent Law Firm LLC

(57) ABSTRACT

An intelligent guiding method and system based on a M2M system are provided. The method includes that when receiving a service request message from an intelligent guiding M2M terminal device, an intelligent guiding M2M platform requests guiding information or a guiding information identifier from an intelligent guiding M2M application according to the location information of the intelligent guiding M2M terminal device; and the intelligent guiding M2M platform sends, to the intelligent guiding M2M terminal device, the guiding information provided by the intelligent guiding M2M application or guiding information that is retrieved according to the guiding information identifier provided by the intelligent guiding M2M application. The M2M tech-
(Continued)

nology and the electronic guiding system thus can be effectively combined, and rich guiding services can be provided based on the M2M system.

9 Claims, 4 Drawing Sheets

(51) Int. Cl.
*G01C 21/34* (2006.01)
*G06Q 50/10* (2012.01)
*H04W 4/00* (2009.01)
*H04W 60/00* (2009.01)
*H04W 12/02* (2009.01)
*H04W 4/04* (2009.01)
*H04W 12/06* (2009.01)

(58) Field of Classification Search
USPC ..................................... 455/456.1–457, 466
See application file for complete search history.

(56) References Cited

U.S. PATENT DOCUMENTS

| | | | |
|---|---|---|---|
| 8,839,022 B2* | 9/2014 | He | ........................ H04W 4/005 714/15 |
| 2003/0125872 A1 | 7/2003 | Kauvo | |
| 2007/0150184 A1 | 6/2007 | Kauvo | |
| 2008/0153521 A1* | 6/2008 | Benaouda | .............. G01D 4/004 455/466 |
| 2011/0238647 A1* | 9/2011 | Ingram | .................... G08G 1/20 707/706 |
| 2012/0290872 A1 | 11/2012 | He | |
| 2015/0120317 A1 | 4/2015 | Mayou et al. | |

FOREIGN PATENT DOCUMENTS

| | | |
|---|---|---|
| CN | 101902681 A | 12/2010 |
| CN | 103139150 A | 6/2013 |

OTHER PUBLICATIONS

English Translation of the Written Opinion of the International Search Authority in international application No. PCT/CN2013/085062, mailed on Apr. 30, 2014.

Supplementary European Search Report in European application No. 13881215.1, mailed on Jul. 7, 2016.

\* cited by examiner

INTELLIGENT GUIDING METHOD AND SYSTEM BASED ON M2M SYSTEM

This application is a continuation of U.S. application Ser. No. 14/904,599 filed Jan. 12, 2016, which application is incorporated herein by reference for all purposes.

TECHNICAL FIELD

The present disclosure relates to the technical field of Machine-to-Machine/Man (M2M) communication, and in particular to an intelligent method and an intelligent system based on an M2M system.

BACKGROUND

An M2M communication network, which extends the communication category and communication field of present information communication networks, acquires information from the physical world by embedding intelligence and communication capabilities into various possible objects, and enhances and improves the intelligence, interactivity and automation degree of the services of the present information communication networks based on the analysis and processing on the information.

The M2M communication network have various network forms, which might be an independent physical network built separately, or might be a logical network built on present public communication networks and various government/enterprise private networks.

The M2M communication network can be divided into three layers logically, including: a perceptive extension layer, a network/service layer and an application layer.

The perceptive extension layer mainly implements the acquisition, automatic identification and intelligent control of physical world information. Each object itself in the physical world has no communication capacity. Intelligent nodes, such as a sensor, an actuator, an intelligent device, a Radio Frequency Identification (RFID) reader-writer and the like, acquire the information of the physical world and interact the information with the network layer through a communication module. An M2M terminal device is divided into two types, one of which is an M2M terminal capable of communicating with an M2M communication network and the other is an M2M gateway capable of communicating with an M2M communication network and an M2M stub network.

The network/service layer supports the transfer, routing and control of information from the perceptive extension layer, and provides a basis for the communication between man and object, between object and object in the Internet of Things. According to the classification of the Internet of Things, the network layer specifically includes network forms such as a communication network, Internet, an industry network and so on; the main component of this layer is an M2M platform.

The application layer contains various specific applications of the Internet of Things, including both public service and industry service, in which the industry service might be a public industry service orientating the public or might be a private industry service meeting the requirement of special applications in an industry, and the public service is a basic service provided in view of the universal need of the public, such as intelligent home, mobile payment and the like. The private industry service generally is provided for the inside of the industry in view of the particular requirement of the industry, for example, smart grid, intelligent transportation system, smart environment and so on. Part of industry services also might be public-orientated services, for example, an intelligent transportation system, which is called an industry public service. The main component contained in the application layer is an M2M application.

Terminal peripheral refers to a single device having an environment sensing function, such as a sensor, which can transmit the sensed information to an M2M service platform or M2M application through an M2M gateway or M2M terminal, and meanwhile can receive the downlink control by the M2M application or M2M service platform.

An electronic guiding system shows the sceneries in a scenic spot and the exhibits in an exhibition hall to tourists in the form of voice, image, text and so on, so as to spread the connotation of the sceneries and exhibits and bring out a more vivid effect while the tourists are watching the sceneries and exhibits; therefore, tourists can obtain a good knowledge while enjoying the experience of the sceneries and exhibits.

If the electronic guiding system and the M2M system can be combined, the electronic guiding function implemented based on a strong M2M system will bring a great convenience to users and will provide more rich guiding services to users. However, there has been no solution to combine an electronic guiding system and an M2M system in related art so far.

SUMMARY

In view of this, the embodiments of the present disclosure provide an intelligent guiding method and an intelligent guiding system based on an M2M system, so as to realize an effective combination of M2M technology and electronic guiding systems, and provide a uniform and safe service platform for different electronic guiding applications and terminal devices through the M2M system.

To this end, the technical solutions of the embodiments of the present disclosure are implemented as follows.

An intelligent guiding method based on an M2M system is provided, including:

when receiving a service request message from an intelligent guiding M2M terminal device, an intelligent guiding M2M platform requests guiding information or a guiding information identifier from an intelligent guiding M2M application according to location information of the intelligent guiding M2M terminal device; and the intelligent guiding M2M platform sends, to the intelligent guiding M2M terminal device, the guiding information provided by the intelligent guiding M2M application or guiding information that is retrieved according to the guiding information identifier provided by the intelligent guiding M2M application.

Preferably, the service request message sent from the intelligent guiding M2M terminal device may include the location information of the intelligent guiding M2M terminal device;

the step that the intelligent guiding M2M platform requests guiding information from an intelligent guiding M2M application according to location information of the intelligent guiding M2M terminal device may include:

the intelligent guiding M2M platform parses the service request message from the intelligent guiding M2M terminal device, builds a new service request message according to the location information of the intelligent guiding M2M terminal device parsed out, and sends the new service request message to the M2M application according to an application port number parsed out;

the intelligent guiding M2M application searches for corresponding guiding information locally according to the location information of the intelligent guiding M2M terminal device included in the received service request message, and returns the corresponding guiding information to the intelligent guiding M2M platform via a service response message.

Preferably, the service request message sent from the intelligent guiding M2M terminal device may include the location information of the intelligent guiding M2M terminal device;

the step that the intelligent guiding M2M platform requests a corresponding guiding information identifier from an intelligent guiding M2M application according to location information of the intelligent guiding M2M terminal device includes:

the intelligent guiding M2M platform parses the service request message from the intelligent guiding M2M terminal device, builds a new service request message according to the location information of the intelligent guiding M2M terminal device parsed out, and sends the new service request message to the M2M application according to an application port number parsed out;

the intelligent guiding M2M application searches for a corresponding guiding information identifier locally according to the location information of the intelligent guiding M2M terminal device included in the received service request message, and returns the corresponding guiding information identifier to the intelligent guiding M2M platform via a service response message;

the method may further include:

the intelligent guiding M2M platform retrieves the corresponding guiding information locally according to the corresponding guiding information identifier included in the service response message.

Preferably, the service request message sent from the intelligent guiding M2M terminal device may not include the location information of the intelligent guiding M2M terminal device;

the step that the intelligent guiding M2M platform requests guiding information from an intelligent guiding M2M application according to location information of the intelligent guiding M2M terminal device may include:

the intelligent guiding M2M platform acquires the location information of the intelligent guiding M2M terminal device from a location server according to an identifier of the intelligent guiding M2M terminal device included in the service request message from the intelligent guiding M2M terminal device, builds a new service request message according to the location information of the intelligent guiding M2M terminal device, and sends the new service request message to the intelligent guiding M2M application according to an application port number obtained by parsing the service request message sent from the intelligent guiding M2M terminal device;

the intelligent guiding M2M application searches for corresponding guiding information locally according to the location information of the intelligent guiding M2M terminal device included in the received service request message, and returns the corresponding guiding information to the intelligent guiding M2M platform via a service response message.

Preferably, the service request message sent from the intelligent guiding M2M terminal device may not include the location information of the intelligent guiding M2M terminal device;

the step that the intelligent guiding M2M platform requests a corresponding guiding information identifier from an intelligent guiding M2M application according to location information of the intelligent guiding M2M terminal device includes:

the intelligent guiding M2M platform acquires the location information of the intelligent guiding M2M terminal device from a location server according to an identifier of the intelligent guiding M2M terminal device included in the service request message sent from the intelligent guiding M2M terminal device, builds a new service request message according to the location information of the intelligent guiding M2M terminal device, and sends the new service request message to the M2M application according to an application port number obtained by parsing the service request message sent from the intelligent guiding M2M terminal device;

the intelligent guiding M2M application searches for a corresponding guiding information identifier locally according to the location information of the intelligent guiding M2M terminal device included in the received service request message, and returns the corresponding guiding information identifier to the intelligent guiding M2M platform via a service response message;

the method may further include:

the intelligent guiding M2M platform retrieves corresponding guiding information locally according to the corresponding guiding information identifier included in the service response message.

Preferably, before the intelligent guiding M2M platform receives the service request message from the intelligent guiding M2M terminal device, the method may further include:

the intelligent guiding M2M terminal device sends a registration request message to the intelligent guiding M2M platform;

after authenticating and authorizing the intelligent guiding M2M terminal device according to a safety certificate and an identifier of the intelligent guiding M2M terminal device which are included in the registration request message, the intelligent guiding M2M platform searches for subscription information corresponding to the intelligent guiding M2M terminal device locally according to the identifier of the intelligent guiding M2M terminal device, and sends an application port number included in the subscription information to the intelligent guiding M2M terminal device via a registration acknowledgement message.

Preferably, after the intelligent guiding M2M platform sends the guiding information to the intelligent guiding M2M terminal device, the method may further include:

the intelligent guiding M2M terminal device executes the guiding information through an information display/play device.

An intelligent guiding system based on an M2M system is provided, including an intelligent guiding M2M platform, an intelligent guiding M2M terminal device and an intelligent guiding M2M application, wherein the intelligent guiding M2M terminal device is configured to send a service request message to the intelligent guiding M2M platform, and to receive and execute guiding information sent by the intelligent guiding M2M platform;

the intelligent guiding M2M platform is configured to, when receiving the service request message from the intelligent guiding M2M terminal device, request guiding information or a guiding information identifier from the intelligent guiding M2M application according to location information of the intelligent guiding M2M terminal device;

and further send, to the intelligent guiding M2M terminal device, the guiding information provided by the intelligent guiding M2M application or guiding information that is retrieved according to the guiding information identifier provided by the intelligent guiding M2M application; and the intelligent guiding M2M application is configured to provide the guiding information or the guiding information identifier.

Preferably, the service request message sent from the intelligent guiding M2M terminal device may include the location information of the intelligent guiding M2M terminal device;

the intelligent guiding M2M platform may be further configured to parse the service request message from the intelligent guiding M2M terminal device, build a new service request message according to the location information of the intelligent guiding M2M terminal device parsed out, and send the new service request message to the corresponding M2M application according to an application port number parsed out;

the intelligent guiding M2M application is further configured to search for corresponding guiding information locally according to the location information of the intelligent guiding M2M terminal device included in the received service request message, and return the corresponding guiding information to the intelligent guiding M2M platform via a service response message.

Preferably, the service request message sent from the intelligent guiding M2M terminal device may include the location information of the intelligent guiding M2M terminal device;

the intelligent guiding M2M platform may be further configured to parse the service request message from the intelligent guiding M2M terminal device, build a new service request message according to the location information of the intelligent guiding M2M terminal device parsed out, and send the new service request message to the corresponding M2M application according to an application port number parsed out;

the intelligent guiding M2M application is further configured to search for a corresponding guiding information identifier locally according to the location information of the intelligent guiding M2M terminal device included in the received service request message, and return the guiding information identifier to the intelligent guiding M2M platform via a service response message;

the intelligent guiding M2M platform is further configured to retrieve the corresponding guiding information locally according to the corresponding guiding information identifier included in the service response message.

Preferably, the service request message sent from the intelligent guiding M2M terminal device may not include the location information of the intelligent guiding M2M terminal device;

the intelligent guiding M2M platform may be further configured to acquire the location information of the intelligent guiding M2M terminal device from a location server according to an identifier of the intelligent guiding M2M terminal device included in the service request message from the intelligent guiding M2M terminal device, build a new service request message according to the location information of the intelligent guiding M2M terminal device, send the new service request message to the corresponding M2M application according to an application port number obtained by parsing the service request message sent from the intelligent guiding M2M terminal device;

the intelligent guiding M2M application is further configured to search for corresponding guiding information locally according to the location information of the intelligent guiding M2M terminal device included in the received service request message, and return the corresponding guiding information to the intelligent guiding M2M platform via a service response message.

Preferably, the service request message sent from the intelligent guiding M2M terminal device may not include the location information of the intelligent guiding M2M terminal device;

the intelligent guiding M2M platform may be further configured to acquire the location information of the intelligent guiding M2M terminal device from a location server according to an identifier of the intelligent guiding M2M terminal device included in the service request message sent from the intelligent guiding M2M terminal device, build a new service request message according to the location information of the intelligent guiding M2M terminal device, and send the new service request message to the intelligent guiding M2M application according to an application port number obtained by parsing the service request message from the intelligent guiding M2M terminal device;

the intelligent guiding M2M application may be further configured to search for a corresponding guiding information identifier locally according to the location information of the intelligent guiding M2M terminal device included in the received service request message, and return the corresponding guiding information identifier to the intelligent guiding M2M platform via a service response message;

the intelligent guiding M2M platform may be further configured to retrieve corresponding guiding information locally according to the corresponding guiding information identifier included in the service response message.

Preferably, the intelligent guiding M2M terminal device may be further configured to send a registration request message to the intelligent guiding M2M platform before sending the service request message;

the intelligent guiding M2M platform may be further configured to, after authenticating and authorizing the intelligent guiding M2M terminal device according to a safety certificate and an identifier of the intelligent guiding M2M terminal device which are included in the registration request message, search for subscription information corresponding to the intelligent guiding M2M terminal device locally according to the identifier of the intelligent guiding M2M terminal device, and send an application port number included in the subscription information to the intelligent guiding M2M terminal device via a registration acknowledgement message.

Preferably, the intelligent guiding M2M terminal device may be further configured to execute, after receiving the guiding information sent from the intelligent guiding M2M platform, the guiding information through an information display/play device.

The embodiments of the present disclosure provide an intelligent guiding method and an intelligent guiding system based on an M2M system, which can realize an effective combination of M2M technology and an electronic guiding system, provide more rich guiding services based on the M2M system, and provide a uniform and safe service platform for different electronic guiding applications and terminal devices through the M2M system.

DETAILED DESCRIPTION

The technical solutions of the present disclosure are described below in further detail in conjunction with accompanying drawings and specific embodiments.

Figure 1:
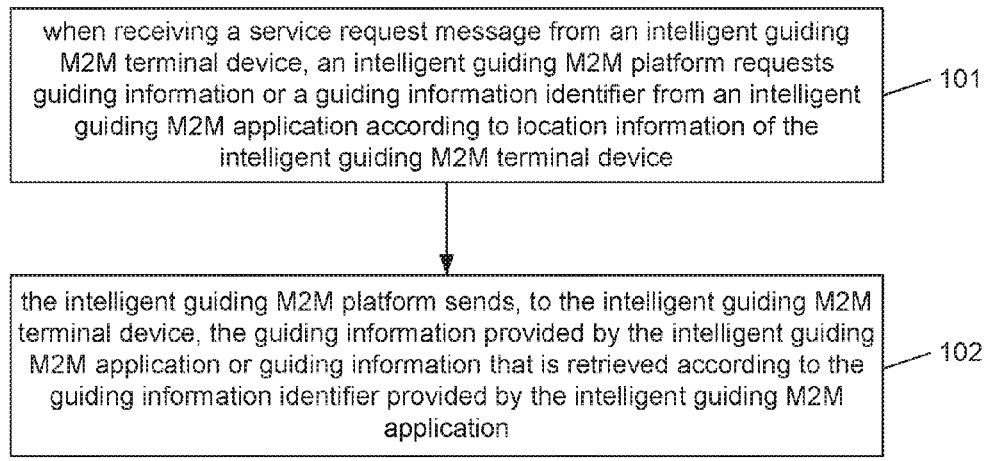
FIG. 1 is a flowchart of an intelligent guiding method based on an M2M system according to the embodiment of the present disclosure.

An embodiment of the present disclosure provides an intelligent guiding method based on an M2M system, which as shown in FIG. 1 mainly includes the steps as follows.

step 101: when receiving a service request message from an intelligent guiding M2M terminal device, an intelligent guiding M2M platform requests corresponding guiding information or a corresponding guiding information identifier from an intelligent guiding M2M application according to the location information of the intelligent guiding M2M terminal device; and step 102: the intelligent guiding M2M platform sends, to the intelligent guiding M2M terminal device, the guiding information provided by the intelligent guiding M2M application or guiding information that is retrieved according to the guiding information identifier provided by the intelligent guiding M2M application.

Preferably, the service request message sent from the intelligent guiding M2M terminal device includes the location information of the intelligent guiding M2M terminal device;

the step that the intelligent guiding M2M platform requests corresponding guiding information from the intelligent guiding M2M application according to the location information of the intelligent guiding M2M terminal device includes:

the intelligent guiding M2M platform parses the service request message from the intelligent guiding M2M terminal device, builds a new service request message according to the location information of the intelligent guiding M2M terminal device parsed out, and sends the new service request message to the corresponding M2M application according to an application port number parsed out;

the intelligent guiding M2M application searches for corresponding guiding information locally according to the location information of the intelligent guiding M2M terminal device included in the received service request message, and returns the guiding information to the intelligent guiding M2M platform via a service response message.

Preferably, the service request message sent from the intelligent guiding M2M terminal device includes the location information of the intelligent guiding M2M terminal device;

the step that the intelligent guiding M2M platform requests corresponding a guiding information identifier from the intelligent guiding M2M application according to the location information of the intelligent guiding M2M terminal device includes:

the intelligent guiding M2M platform parses the service request message from the intelligent guiding M2M terminal device, builds a new service request message according to the location information of the intelligent guiding M2M terminal device parsed out, and sends the new service request message to the corresponding M2M application according to an application port number parsed out;

the intelligent guiding M2M application searches for a corresponding guiding information identifier locally according to the location information of the intelligent guiding M2M terminal device included in the received service request message, and returns the corresponding guiding information identifier to the intelligent guiding M2M platform via a service response message;

the method further includes: the intelligent guiding M2M platform retrieves corresponding guiding information locally according to the corresponding guiding information identifier included in the service response message.

Preferably, the service request message sent from the intelligent guiding M2M terminal device does not include the location information of the intelligent guiding M2M terminal device;

the step that the intelligent guiding M2M platform requests corresponding guiding information from the intelligent guiding M2M application according to the location information of the intelligent guiding M2M terminal device includes:

the intelligent guiding M2M platform acquires the location information of the intelligent guiding M2M terminal device from a location server according to an identifier of the intelligent guiding M2M terminal device included in the service request message from the intelligent guiding M2M terminal device, builds a new service request message according to the location information of the intelligent guiding M2M terminal device, and sends the new service request message to the corresponding M2M application according to the application port number obtained by parsing the service request message from the intelligent guiding M2M terminal device;

the intelligent guiding M2M application searches for corresponding guiding information locally according to the location information of the intelligent guiding M2M terminal device included in the received service request message, and returns the corresponding guiding information to the intelligent guiding M2M platform via a service response message.

Preferably, the service request message sent from the intelligent guiding M2M terminal device does not include the location information of the intelligent guiding M2M terminal device;

the step that the intelligent guiding M2M platform requests corresponding a guiding information identifier from the intelligent guiding M2M application according to the location information of the intelligent guiding M2M terminal device includes:

the intelligent guiding M2M platform acquires the location information of the intelligent guiding M2M terminal device from a location server according to an identifier of the intelligent guiding M2M terminal device included in the service request message from the intelligent guiding M2M terminal device, builds a new service request message according to the location information of the intelligent guiding M2M terminal device, and sends the new service request message to the corresponding M2M application according to an application port number obtained by parsing the service request message from the intelligent guiding M2M terminal device;

the intelligent guiding M2M application searches for a corresponding guiding information identifier locally according to the location information of the intelligent guiding M2M terminal device included in the received service request message, and returns the corresponding guiding information identifier to the intelligent guiding M2M platform via a service response message;

the method further includes: the intelligent guiding M2M platform retrieves corresponding guiding information locally according to the corresponding guiding information identifier included in the service response message.

Preferably, before the intelligent guiding M2M platform receives a service request message from the intelligent guiding M2M terminal device, the method further includes:

the intelligent guiding M2M terminal device sends a registration request message to the intelligent guiding M2M platform;

after authenticating and authorizing the intelligent guiding M2M terminal device according to a safety certificate and an identifier of the intelligent guiding M2M terminal device which are included in the registration request message, the intelligent guiding M2M platform searches for subscription information corresponding to the intelligent guiding M2M terminal device locally according to an identifier of the intelligent guiding M2M terminal device, and sends an application port number included in the subscription information to the intelligent guiding M2M terminal device via a registration acknowledgement message.

Preferably, after the intelligent guiding M2M platform sends the guiding information to the intelligent guiding M2M terminal device, the method further includes: the intelligent guiding M2M terminal device executes the guiding information through an information display/play device.

The intelligent guiding method based on an M2M system described above is illustrated below in further detail in conjunction with specific embodiments.

Figure 2:
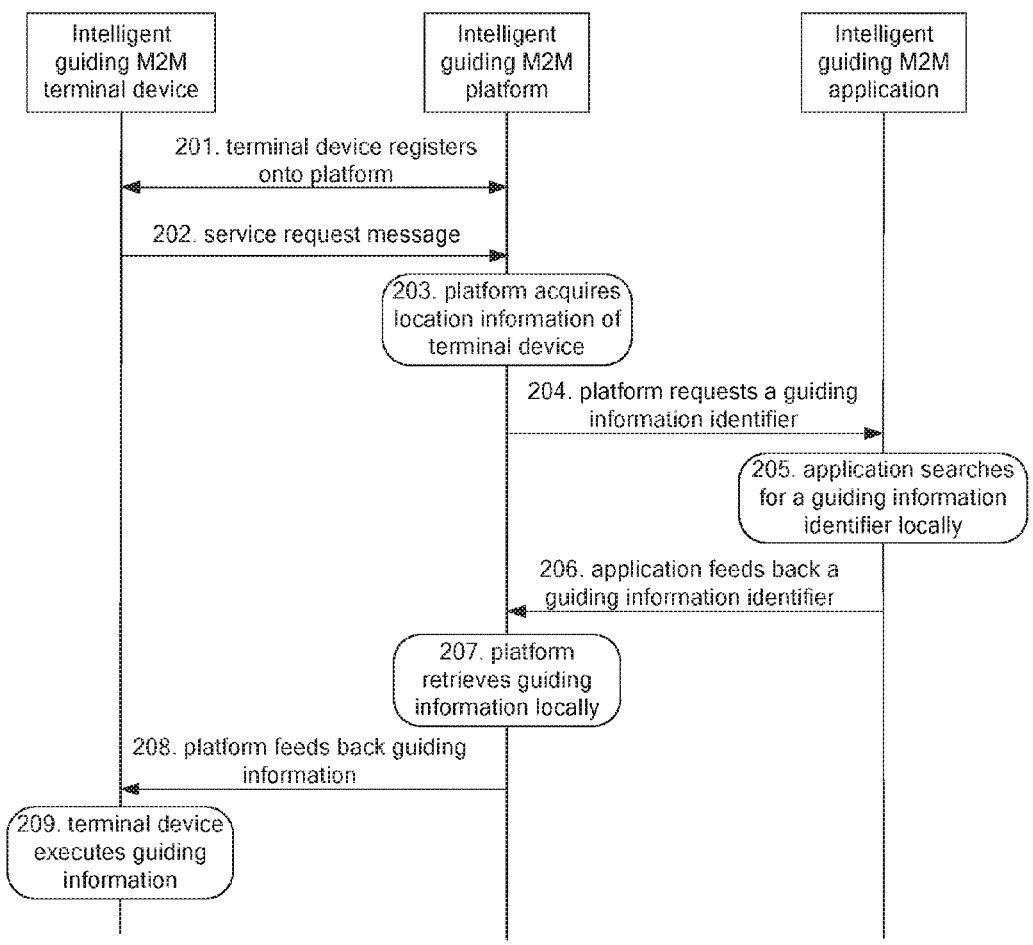
FIG. 2 is a flowchart of an intelligent guiding method based on an M2M system according to Embodiment 1 of the present disclosure.

An intelligent guiding method based on an M2M system provided in Embodiment 1 of the present disclosure, as shown in FIG. 2, mainly includes steps as follows.

Step 201: an intelligent guiding M2M terminal device (hereinafter called a terminal device for short) sends a registration request message to an intelligent guiding M2M platform (hereinafter called an M2M platform for short) after the terminal device is started, the request message including the safety certificate and identifier of the terminal device.

After authenticating and authorizing the terminal device, the M2M platform searches the locally stored information for subscription information corresponding to the terminal device according to an identifier of the terminal device, the subscription information including an application port number of an intelligent guiding M2M application (hereinafter called an M2M application for short) associated with the terminal device, then the M2M platform sends the application port number to the terminal device through a registration acknowledgement message.

Step 202: after finishing registration, the terminal device sends a service request message to the M2M platform. The request message contains the following information:

| Information Element | Notes |
| --- | --- |
| Application port number | Application port number assigned to an intelligent guiding M2M application by an intelligent guiding M2M platform |
| Service request type | Indicating the requested service type |

-continued

| Information Element | Notes |
| --- | --- |
| Terminal device identifier | The identifier of an intelligent guiding M2M terminal or gateway in an intelligent guiding M2M system | where the service request type is set as Guiding Information.

Steps 203-204: the M2M platform receives and parses the service request message from the terminal device, acquires the location information of the terminal device from a location server according to an identifier of the terminal device in the service request message after authenticating the service type in the service request message, builds a new service request message after encrypting the location information, and sends the new service request message to the M2M application according to the application port number. The new service request message contains the following information:

| Information Element | Notes |
| --- | --- |
| Service request type | Indicating the requested service type |
| Service request data | Carrying information data needed by the requested service type |
| Terminal device identifier | The identifier of an intelligent guiding M2M terminal or gateway in an intelligent guiding M2M system | where the service request type is set as Guiding Information; the service request data includes the location information of the terminal device.

Steps 205-206: the M2M application receives and parses the service request message, identifies the service type, searches the locally stored data for a corresponding guiding information identifier according to the location information of the terminal device contained in the service request data, and sends the guiding information identifier to the M2M platform through a service response message. The service response message contains the following information.

| Information Element | Notes |
| --- | --- |
| Terminal device identifier | The identifier of an intelligent guiding M2M terminal or gateway in an intelligent guiding M2M system |
| Service response type | indicating the responded service type |
| Service response data | Carrying information data needed by the responded service type | where the service response type is set as Guiding Information; the service response data includes the guiding information identifier corresponding to the location information of the terminal device.

During specific implementation, a mapping relationship table between location information and a guiding information identifier can be established in the locally stored data of the M2M application, for example,

| Location Information | Guiding information identifier |
| --- | --- |
| Location area #1 or location identifier #1 | Identifier #1 |
| Location area #2 or location identifier #2 | Identifier #2 |
| ... | ... |
| Location area #N or location identifier #N | Identifier #N |

Steps 207-208: the M2M platform receives and parses the service response message, identifies the service type, and retrieves the corresponding guiding information in the locally stored data according to the guiding information identifier contained in the service response data. After packaging the retrieved guiding information, the M2M platform builds a new service response message and sends it to the terminal device according to the identifier of the terminal device. The new service response message contains the following information:

| Information Element | Notes |
| --- | --- |
| Terminal device identifier | The identifier of an intelligent guiding M2M terminal or gateway in an intelligent guiding M2M system |
| Service response type | Indicating the responded service type |
| Service response data | Carrying information data needed by the responded service type | where the service response type is set as Guiding Information; the service response data includes guiding information data corresponding to a guiding information identifier.

Meanwhile, the M2M platform charges the terminal device according to the service type and/or service data.

During specific implementation, a mapping relationship table between a guiding information identifier and guiding information can be established in the locally stored data of the intelligent guiding M2M application, for example,

| Guiding information identifier | Guiding Information |
| --- | --- |
| Identifier #1 | Guiding information data #1 |
| Identifier #2 | Guiding information data #2 |
| . . . | . . . |
| Identifier #N | Guiding information data #N |

Step 209: the terminal device receives and parses the service response message, identifies the service type, reads the service response data, and executes the guiding information contained in the service response data through an information display/play device.

It should be noted that the information display/play device might be an image, text display device and/or a voice, video play device and so on, which might be a component of the intelligent guiding M2M terminal, or a component of a terminal peripheral connected with an intelligent M2M gateway.

Figure 3:
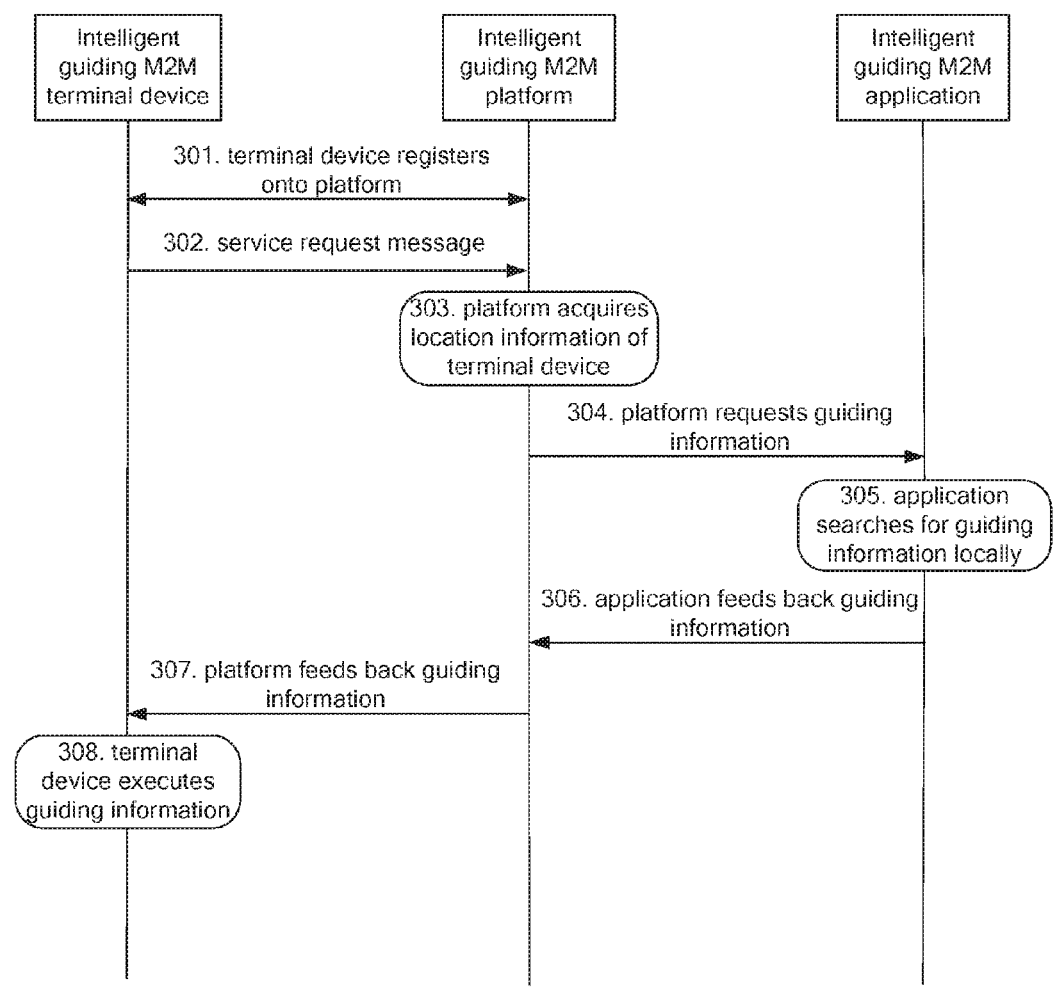
FIG. 3 is a flowchart of an intelligent guiding method based on an M2M system according to Embodiment 2 of the present disclosure.

An intelligent guiding method based on an M2M system provided in Embodiment 2 of the present disclosure, as shown in FIG. 3, mainly includes steps as follows.

Step 301: an intelligent guiding M2M terminal device (hereinafter called a terminal device for short) sends a registration request message to an intelligent guiding M2M platform (hereinafter called an M2M platform for short) after the terminal device is started, the request message including the safety certificate and the identifier of the terminal device.

After authenticating and authorizing the terminal device, the M2M platform searches the locally stored information for subscription information corresponding to the terminal device according to an identifier of the terminal device, the subscription information including an application port number of an intelligent guiding M2M application (hereinafter called an M2M application for short) associated with the terminal device, then the M2M platform sends the application port number to the terminal device through a registration acknowledgement message.

Step 302: after finishing registration, the terminal device sends a service request message to the M2M platform. The request message contains the following information:

| Information Element | Notes |
| --- | --- |
| Application port number | Application port number assigned to an intelligent guiding M2M application by an intelligent guiding M2M platform |
| Service request type | Indicating the requested service type |
| Terminal device identifier | The identifier of an intelligent guiding M2M terminal or gateway in an intelligent guiding M2M system | where the service request type is set as Guiding Information.

Steps 303-304: the M2M platform receives and parses the service request message from the terminal device, acquires the location information of the terminal device from a location server according to an identifier of the terminal device in the service request message after authenticating the service type in the service request message, builds a new service request message after encrypting the location information, and sends the new service request message to the M2M application according to an application port number. The new service request message contains the following information:

| Information Element | Notes |
| --- | --- |
| Service request type | Indicating the requested service type |
| Service request data | Carrying information data needed by the requested service type |
| Terminal device identifier | The identifier of an intelligent guiding M2M terminal or gateway in an intelligent guiding M2M system | where the service request type is set as Guiding Information; the service request data includes the location information of the terminal device.

Steps 305-306: the M2M application receives and parses the service request message, identifies the service type, searches for the locally stored data for corresponding guiding information according to the location information of the terminal device contained in the service request data, and sends the guiding information to the M2M platform through a service response message. The service response message contains the following information.

| Information Element | Notes |
| --- | --- |
| Terminal device identifier | The identifier of an intelligent guiding M2M terminal or gateway in an intelligent guiding M2M system |
| Service response type | Indicating the responded service type |
| Service response data | Carrying information data needed by the responded service type | where the service response type is set as Guiding Information; the service response data includes the guiding information corresponding to the location information of the terminal device.

During specific implementation, a mapping relationship table between location information and guiding information can be established in the locally stored data of the M2M application, for example,

| Location Information | Guiding Information |
| --- | --- |
| Location area #1 or location identifier #1 | Guiding information data #1 |
| Location area #2 or location identifier #2 | Guiding information data #2 |
| ... | ... |
| Location area #N or location identifier #N | Guiding information data #N |

Step 307: the M2M platform receives and parses the service response message, identifies the service type, and sends the guiding information to the terminal device according to an identifier of the terminal device. Meanwhile, the M2M platform charges the terminal device according to the service type and/or service data.

Step 308: the terminal device receives and parses the service response message, identifies the service type, reads the service response data, and executes the guiding information contained in the service response data through an information display/play device.

It should be noted that the information display/play device might be an image, text display device and/or a voice, video play device and so on, which might be a component of the intelligent guiding M2M terminal, or a component of a terminal peripheral connected with the intelligent M2M gateway.

Figure 4:
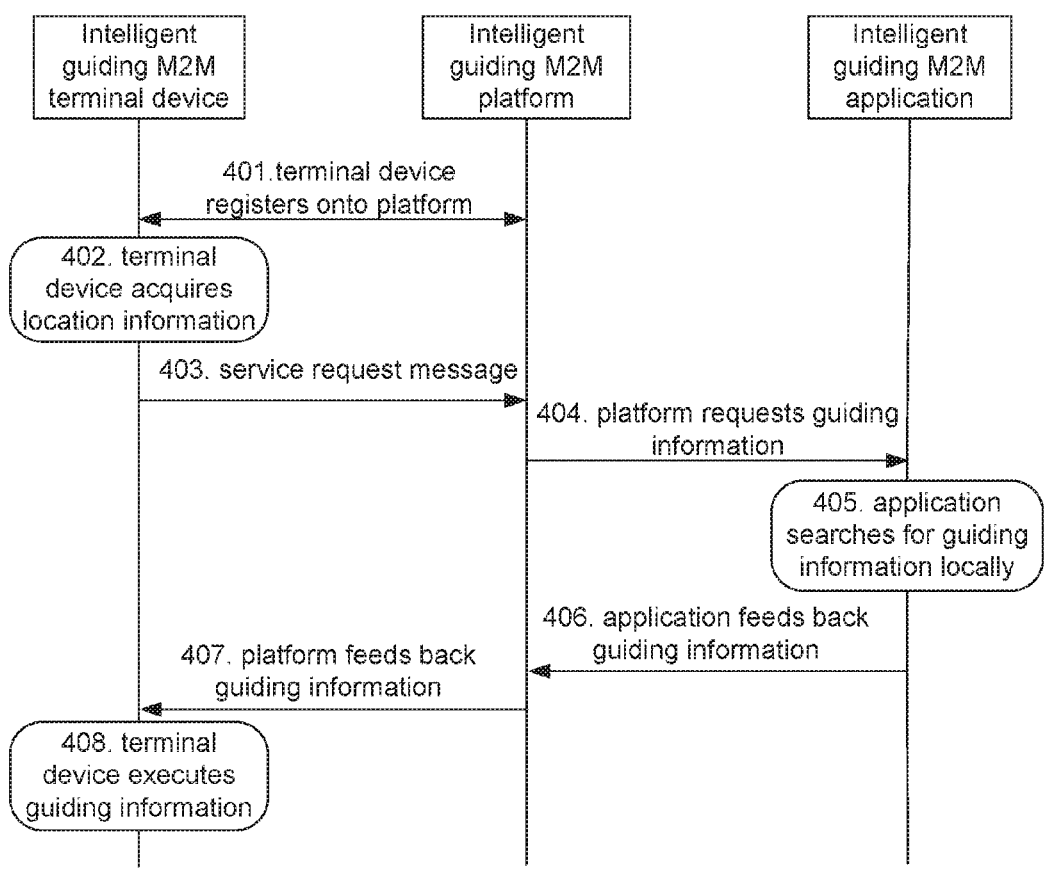
FIG. 4 is a flowchart of an intelligent guiding method based on an M2M system according to Embodiment 3 of the present disclosure.

An intelligent guiding method based on an M2M system provided in Embodiment 3 of the present disclosure, as shown in FIG. 4, mainly includes steps as follows.

Step 401: an intelligent guiding M2M terminal device (hereinafter called a terminal device for short) sends a registration request message to an intelligent guiding M2M platform (hereinafter called an M2M platform for short) after the terminal device is started, the request message including the safety certificate and the identifier of the terminal device.

After authenticating and authorizing the terminal device, the M2M platform searches the locally stored information for subscription information corresponding to the terminal device according to an identifier of the terminal device, the subscription information including the application port number of an intelligent guiding M2M application (hereinafter called an M2M application for short) associated with the terminal device, then the M2M platform sends the application port number to the terminal device through a registration acknowledgement message.

Steps 402-403: after finishing registration, the terminal device acquires the location information through a positioning device or an information collection/input device, and sends a service request message to the M2M platform. The service request message contains the following information:

| Information Element | Notes |
| --- | --- |
| Application port number | Application port number assigned to an intelligent guiding M2M application by an intelligent guiding M2M platform |
| Service type | Indicating the requested service type |
| Service request data | Carrying information data needed by the requested service type |
| Terminal device identifier | The identifier of an intelligent guiding M2M terminal or gateway in an intelligent guiding M2M system | where the service request type is set as Guiding Information; the service request data includes the location information of the terminal device.

It should be noted that the positioning device might be a base station positioning device, a Global Positioning System (GPS), a Wireless Fidelity (Wi-Fi) positioning device and so on, which might be a component of the intelligent guiding M2M terminal, or a component of a terminal peripheral connected with the intelligent guiding M2M gateway.

The information collection/input device might be a barcode scanning device, a Radio Frequency Identification Device (RFID), and/or a touchscreen, a keyboard, a manual input device and so on, which might be a component of the intelligent guiding M2M terminal, or a component of a terminal peripheral connected with the intelligent guiding M2M gateway.

Step 404: the M2M platform receives and parses the service request message from the terminal device, builds a new service request message after authenticating the service type in the service request message and encrypting the service request data, and sends the new service request message to the M2M application according to the application port number. The new service request message contains the following information:

| Information Element | Notes |
| --- | --- |
| Service request type | Indicating the requested service type |
| Service request data | Carrying information data needed by the requested service type |
| Terminal device identifier | The identifier of an intelligent guiding M2M terminal or gateway in an intelligent guiding M2M system | where the service request type is set as Guiding Information; the service request data includes the location information of the terminal device.

Steps 405-406: the M2M application receives and parses the service request message, identifies the service type, searches the locally stored data for corresponding guiding information according to the location information of the terminal device contained in the service request data, and sends the guiding information to the M2M platform through a service response message. The service response message contains the following information.

| Information Element | Notes |
| --- | --- |
| Terminal device identifier | The identifier of an intelligent guiding M2M terminal or gateway in an intelligent guiding M2M system |
| Service response type | Indicating the responded service type |
| Service response data | Carrying information data needed by the responded service type | where the service response type is set as Guiding Information; the service response data includes the guiding information corresponding to the location information of the terminal device.

During specific implementation, a mapping relationship table between the location information and the guiding information can be established in the locally stored data of the M2M application, for example,

| Location Information | Guiding Information |
| --- | --- |
| Location area #1 or location identifier #1 | Guiding information data #1 |
| Location area #2 or location identifier #2 | Guiding information data #2 |
| ... | ... |
| Location area #N or location identifier #N | Guiding information data #N |

Step 407: the M2M platform receives and parses the service response message, identifies the service type, and sends the guiding information to the terminal device according to an identifier of the terminal device. Meanwhile, the M2M platform charges the terminal device according to the service type and/or service data.

Step 408: the terminal device receives and parses the service response message, identifies the service type, reads the service response data, and executes the guiding information contained in the service response data through an information display/play device.

It should be noted that the information display/play device might be an image, text display device and/or a voice, video play device and so on, which might be a component of the intelligent guiding M2M terminal, or a component of a terminal peripheral connected with the intelligent M2M gateway.

Figure 5:
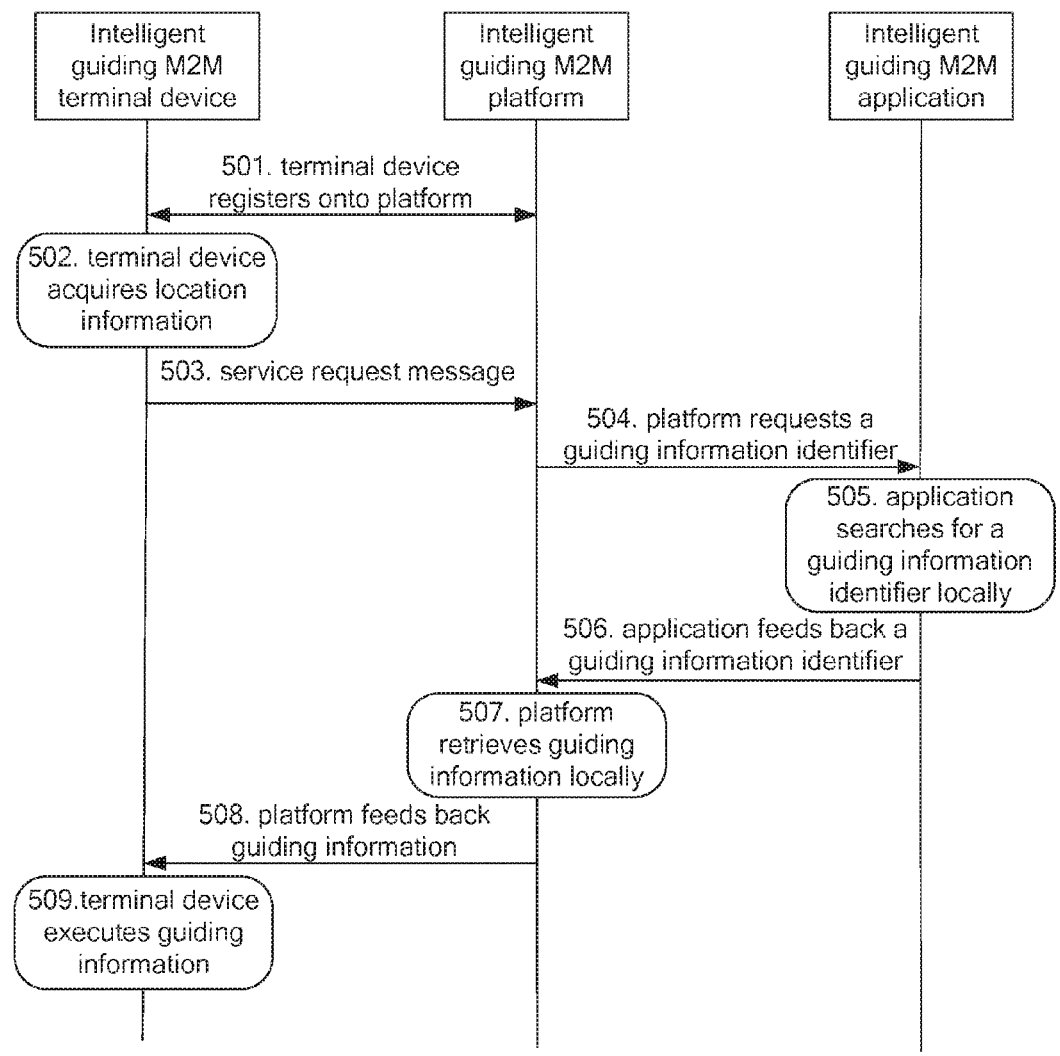
FIG. 5 is a flowchart of an intelligent guiding method based on an M2M system according to Embodiment 4 of the present disclosure.

An intelligent guiding method based on an M2M system provided in Embodiment 4 of the present disclosure, as shown in FIG. 5, mainly includes steps as follows.

Step 501: an intelligent guiding M2M terminal device (hereinafter called a terminal device for short) sends a registration request message to an intelligent guiding M2M platform (hereinafter called an M2M platform for short) after the terminal device is started, the request message including the safety certificate and the identifier of the terminal device.

After authenticating and authorizing the terminal device, the M2M platform searches the locally stored information for subscription information corresponding to the terminal device according to an identifier of the terminal device, the subscription information including the application port number of an intelligent guiding M2M application (hereinafter called an M2M application for short) associated with the terminal device, then the M2M platform sends the application port number to the terminal device through a registration acknowledgement message.

Steps 502-503: after finishing registration, the terminal device acquires the location information through a positioning device or an information collection/input device, and sends a service request message to the M2M platform. The service request message contains the following information:

| Information Element | Notes |
| --- | --- |
| Application port number | Application port number assigned to an intelligent guiding M2M application by an intelligent guiding M2M platform |
| Service type | Indicating the requested service type |
| Service request data | Carrying information data needed by the requested service type |
| Terminal device identifier | The identifier of an intelligent guiding M2M terminal or gateway in an intelligent guiding M2M system | where the service request type is set as Guiding Information; the service request data includes the location information of the terminal device.

It should be noted that the positioning device might be a base station positioning device, a Global Positioning System, a Wireless Fidelity positioning device and so on, which might be a component of the intelligent guiding M2M terminal, or a component of a terminal peripheral connected with an intelligent guiding M2M gateway.

The information collection/input device might be a barcode scanning device, a RFID device, and/or a touchscreen, a keyboard, a manual input device and so on, which might be a component of the intelligent guiding M2M terminal, or a component of a terminal peripheral connected with an intelligent guiding M2M gateway.

Step 504: the M2M platform receives and parses the service request message from the terminal device, builds a new service request message after authenticating the service type in the service request message and encrypting the service request data, and sends the new service request message to the M2M application according to the application port number. The new service request message contains the following information:

| Information Element | Notes |
| --- | --- |
| Service request type | Indicating the requested service type |
| Service request data | Carrying information data needed by the requested service type |
| Terminal device identifier | The identifier of an intelligent guiding M2M terminal or gateway in an intelligent guiding M2M system | where the service request type is set as Guiding Information; the service request data includes the location information of the terminal device.

Steps 505-506: the M2M application receives and parses the service request message, identifies the service type, searches the locally stored data for a corresponding guiding information identifier according to the location information of the terminal device contained in the service request data, and sends the guiding information identifier to the M2M platform through a service response message. The service response message contains the following information.

| Information Element | Notes |
| --- | --- |
| Terminal device identifier | The identifier of an intelligent guiding M2M terminal or gateway in an intelligent guiding M2M system |
| Service response type | Indicating the responded service type |
| Service response data | Carrying information data needed by the responded service type | where the service response type is set as Guiding Information; the service response data includes the guiding information identifier corresponding to the location information of the terminal device.

During specific implementation, a mapping relationship table between location information and a guiding information identifier can be established in the locally stored data of the M2M application, for example,

| Location Information | Guiding information identifier |
| --- | --- |
| Location area #1 or location identifier #1 | Identifier #1 |
| Location area #2 or location identifier #2 | Identifier #2 |
| ... | ... |
| Location area #N or location identifier #N | Identifier #N |

Steps 507-508: the M2M platform receives and parses the service response message, identifies the service type, and retrieves the corresponding guiding information in the locally stored data according to the guiding information identifier contained in the service response data. After packaging the retrieved guiding information, the M2M platform builds a new service response message and sends it to the terminal device according to the identifier of the terminal device. The new service response message contains the following information:

| Information Element | Notes |
| --- | --- |
| Terminal device identifier | The identifier of an intelligent guiding M2M terminal or gateway in an intelligent guiding M2M system |
| Service response type | indicating the responded service type |
| Service response data | Carrying information data needed by the responded service type | where the service response type is set as Guiding Information; the service response data includes the guiding information data corresponding to the guiding information identifier.

Meanwhile, the M2M platform charges the terminal device according to the service type and/or service data.

During specific implementation, a mapping relationship table between a guiding information identifier and guiding information can be established in the locally stored data of the M2M application, for example,

| Guiding information identifier | Guiding Information |
| --- | --- |
| Identifier #1 | Guiding information data #1 |
| Identifier #2 | Guiding information data #2 |
| ... | ... |
| Identifier #N | Guiding information data #N |

Step 509: the terminal device receives and parses the service response message, identifies the service type, reads the service response data, and executes the guiding information contained in the service response data through an information display/play device.

It should be noted that the information display/play device might be an image, text display device and/or a voice, video play device and so on, which might be a component of the intelligent guiding M2M terminal, or a component of a terminal peripheral connected with the intelligent M2M gateway.

An embodiment of the present disclosure also provides an intelligent guiding system based on an M2M system, including an intelligent guiding M2M platform, an intelligent guiding M2M terminal device and an intelligent guiding M2M application, wherein the intelligent guiding M2M terminal device is configured to send a service request message to the intelligent guiding M2M platform, and to receive and execute guiding information sent by the intelligent guiding M2M platform;

the intelligent guiding M2M platform is configured to: when receiving the service request message from the intelligent guiding M2M terminal device, request guiding information or a guiding information identifier from the intelligent guiding M2M application according to location information of the intelligent guiding M2M terminal device; and further send, to the intelligent guiding M2M terminal device, the guiding information provided by the intelligent guiding M2M application or guiding information that is retrieved according to the guiding information identifier provided by the intelligent guiding M2M application;

the intelligent guiding M2M application is configured to provide the guiding information or the guiding information identifier.

Preferably, the service request message sent from the intelligent guiding M2M terminal device includes the location information of the terminal device;

the intelligent guiding M2M platform is further configured to: parse the service request message from the terminal device, build a new service request message according to the location information of the terminal device parsed out, and send the new service request message to the corresponding M2M application according to the application port number parsed out;

the intelligent guiding M2M application is further configured to: search for corresponding guiding information locally according to the location information of the terminal device included in the received service request message, and return the guiding information to the intelligent guiding M2M platform via a service response message.

Preferably, the service request message sent from the intelligent guiding M2M terminal device includes the location information of the terminal device;

the intelligent guiding M2M platform is further configured to: parse the service request message from the terminal device, build a new service request message according to the location information of the terminal device parsed out, and send the new service request message to the corresponding M2M application according to the application port number parsed out;

the intelligent guiding M2M application is further configured to: search for a corresponding guiding information identifier locally according to the location information of the terminal device included in the received service request message, and return the guiding information identifier to the intelligent guiding M2M platform via a service response message;

the intelligent guiding M2M platform is further configured to: retrieve the corresponding guiding information locally according to the guiding information identifier included in the service response message.

Preferably, the service request message sent from the intelligent guiding M2M terminal device does not include the location information of the terminal device;

the intelligent guiding M2M platform is further configured to: acquire the location information of the terminal device from a location server according to an identifier of the terminal device included in the service request message from the terminal device, build a new service request message according to the location information of the terminal device, send the new service request message to the M2M application according to the application port number obtained by parsing the service request message from the terminal device;

the intelligent guiding M2M application is further configured to: search for corresponding guiding information locally according to the location information of the terminal device included in the received service request message, and return the guiding information to the intelligent guiding M2M platform via a service response message.

Preferably, the service request message sent from the intelligent guiding M2M terminal device does not include the location information of the terminal device;

the intelligent guiding M2M platform is further configured to: acquire the location information of the terminal device from a location server according to an identifier of the terminal device included in the service request message from the terminal device, build a new service request message according to the location information of the terminal device, and send the new service request message to the M2M application according to the application port number obtained by parsing the service request message from the terminal device;

the intelligent guiding M2M application is further configured to: search for corresponding a guiding information identifier locally according to the location information of the terminal device included in the received service request message, and return the guiding information identifier to the intelligent guiding M2M platform via a service response message;

the intelligent guiding M2M platform is further configured to: retrieve the corresponding guiding information locally according to the guiding information identifier included in the service response message.

Preferably, the intelligent guiding M2M terminal device is further configured to send a registration request message to the intelligent guiding M2M platform before sending a service request message;

the intelligent guiding M2M platform is further configured to: after authenticating and authorizing the terminal device according to a safety certificate and an identifier of the terminal device which are included in the registration request message, search for subscription information corresponding to the terminal device locally according to an identifier of the terminal device, and send an application port number included in the subscription information to the terminal device via a registration acknowledgement message.

Preferably, the intelligent guiding M2M terminal device is further configured to execute, after receiving the guiding information from the intelligent guiding M2M platform, the guiding information through an information display/play device.

It should be noted that the intelligent guiding M2M terminal device described in the embodiment of the present disclosure includes two types, one of which is an M2M terminal capable of communicating with an M2M communication network and the other is an M2M gateway capable of communicating with an M2M communication network and an M2M stub network. The information display/play device might be a component of the first type of intelligent guiding M2M terminal device (that is, the M2M terminal capable of communicating with an M2M communication network), or a component of a terminal peripheral connected with the second type of intelligent guiding M2M terminal device (that is, the M2M gateway capable of communicating with an M2M communication network and an M2M stub network).

It should be noted that all functions of the intelligent guiding M2M platform described in the above embodiment of the present disclosure can be implemented by a special server or device; all functions of the intelligent guiding M2M application also can be implemented by a special server or device.

To sum up, the embodiments of the present disclosure realize an effective combination of M2M technology and an electronic guiding system, provides more rich guiding services based on an M2M system, and provides a uniform and safe service platform for different electronic guiding applications and terminal devices through the M2M system.

The above are the preferred embodiments of the present disclosure only, and are not intended to limit the scope of protection of the present disclosure.

What is claimed is:

1. An intelligent guiding method based on a Machine-to-Machine/Man (M2M) system, comprising:
   when an intelligent guiding M2M platform receives a service request message from an intelligent guiding M2M terminal device, requesting, by the intelligent guiding M2M platform, guiding information or a guiding information identifier from an intelligent guiding M2M application according to location information of the intelligent guiding M2M terminal device; and sending, by the intelligent guiding M2M platform, to the intelligent guiding M2M terminal device the guiding information provided by the intelligent guiding M2M application or guiding information that is retrieved according to the guiding information identifier provided by the intelligent guiding M2M application;

wherein the service request message sent from the intelligent guiding M2M terminal device does not comprise the location information of the intelligent guiding M2M terminal device; the step of requesting, by the intelligent guiding M2M platform, guiding information from an intelligent guiding M2M application according to location information of the intelligent guiding M2M terminal device comprises:

acquiring, by the intelligent guiding M2M platform, the location information of the intelligent guiding M2M terminal device from a location server according to an identifier of the intelligent guiding M2M terminal device included in the service request message sent from the intelligent guiding M2M terminal device;

building, by the intelligent guiding M2M platform, a new service request message according to the location information of the intelligent guiding M2M terminal device;

sending, by the intelligent guiding M2M platform, the new service request message to the intelligent guiding M2M application according to an application port number obtained by parsing the service request message sent from the intelligent guiding M2M terminal device;

searching for, by the intelligent guiding M2M application, corresponding guiding information locally according to the location information of the intelligent guiding M2M terminal device included in the received service request message, and returning, by the intelligent guiding M2M application, the corresponding guiding information to the intelligent guiding M2M platform via a service response message.

2. The intelligent guiding method based on an M2M system according to claim 1, wherein before the intelligent guiding M2M platform receives the service request message from the intelligent guiding M2M terminal device, the method further comprises:
   sending, by the intelligent guiding M2M terminal device, a registration request message to the intelligent guiding M2M platform;
   after authenticating and authorizing the intelligent guiding M2M terminal device according to a safety certificate and an identifier of the intelligent guiding M2M terminal device which are included in the registration request message, searching for, by the intelligent guiding M2M platform, subscription information corresponding to the intelligent guiding M2M terminal device locally according to the identifier of the intelligent guiding M2M terminal device; and sending, by the intelligent guiding M2M platform, an application port number included in the subscription information to the intelligent guiding M2M terminal device via a registration acknowledgement message.

3. The intelligent guiding method based on an M2M system according to claim 1, wherein after the intelligent guiding M2M platform sends the guiding information to the intelligent guiding M2M terminal device, the method further comprises:
   executing, by the intelligent guiding M2M terminal device, the guiding information through an information display/play device.

4. An intelligent guiding method based on a Machine-to-Machine/Man (M2M) system, comprising:
   when an intelligent guiding M2M platform receives a service request message from an intelligent guiding M2M terminal device, requesting, by the intelligent guiding M2M platform, guiding information or a guiding information identifier from an intelligent guiding M2M application according to location information of the intelligent guiding M2M terminal device; and
   sending, by the intelligent guiding M2M platform, to the intelligent guiding M2M terminal device the guiding information provided by the intelligent guiding M2M application or guiding information that is retrieved according to the guiding information identifier provided by the intelligent guiding M2M application;
   wherein the service request message sent from the intelligent guiding M2M terminal device does not comprise the location information of the intelligent guiding M2M terminal device; the step of requesting, by the intelligent guiding M2M platform, a guiding information identifier from an intelligent guiding M2M application according to location information of the intelligent guiding M2M terminal device comprises:
   acquiring, by the intelligent guiding M2M platform, the location information of the intelligent guiding M2M terminal device from a location server according to an identifier of the intelligent guiding M2M terminal device included in the service request message sent from the intelligent guiding M2M terminal device; building, by the intelligent guiding M2M platform, a new service request message according to the location information of the intelligent guiding M2M terminal device; and sending, by the intelligent guiding M2M platform, the new service request message to the intelligent guiding M2M application according to an application port number obtained by parsing the service request message sent from the intelligent guiding M2M terminal device;
   searching for, by the intelligent guiding M2M application, a corresponding guiding information identifier locally according to the location information of the intelligent guiding M2M terminal device included in the received service request message, and returning, by the intelligent guiding M2M application, the corresponding guiding information identifier to the intelligent guiding M2M platform via a service response message;
   the method further comprises: retrieving, by the intelligent guiding M2M platform, corresponding guiding information locally according to the corresponding guiding information identifier included in the service response message.

5. The intelligent guiding method based on an M2M system according to claim 4, wherein before the intelligent guiding M2M platform receives the service request message from the intelligent guiding M2M terminal device, the method further comprises:
   sending, by the intelligent guiding M2M terminal device, a registration request message to the intelligent guiding M2M platform;
   after authenticating and authorizing the intelligent guiding M2M terminal device according to a safety certificate and an identifier of the intelligent guiding M2M terminal device which are included in the registration request message, searching for, by the intelligent guiding M2M platform, subscription information corresponding to the intelligent guiding M2M terminal device locally according to the identifier of the intelligent guiding M2M terminal device; and sending, by the intelligent guiding M2M platform, an application port number included in the subscription information to the intelligent guiding M2M terminal device via a registration acknowledgement message.

6. The intelligent guiding method based on an M2M system according to claim 4, wherein after the intelligent guiding M2M platform sends the guiding information to the intelligent guiding M2M terminal device, the method further comprises:
   executing, by the intelligent guiding M2M terminal device, the guiding information through an information display/play device.

7. An intelligent guiding system based on a Machine-to-Machine/Man (M2M) system, comprising an intelligent guiding M2M platform, an intelligent guiding M2M terminal device and an intelligent guiding M2M application, wherein
   the intelligent guiding M2M terminal device is configured to send a service request message to the intelligent guiding M2M platform, and to receive and execute guiding information sent by the intelligent guiding M2M platform;
   the intelligent guiding M2M platform is configured to, when receiving the service request message from the intelligent guiding M2M terminal device, request guiding information or a guiding information identifier from the intelligent guiding M2M application according to location information of the intelligent guiding M2M terminal device; and further send, to the intelligent guiding M2M terminal device, the guiding information provided by the intelligent guiding M2M application or guiding information that is retrieved according to the guiding information identifier provided by the intelligent guiding M2M application; and
   the intelligent guiding M2M application is configured to provide the guiding information or the guiding information identifier; wherein the service request message sent from the intelligent guiding M2M terminal device does not comprise the location information of the intelligent guiding M2M terminal device;
   the intelligent guiding M2M platform is further configured to acquire the location information of the intelligent guiding M2M terminal device from a location server according to an identifier of the intelligent guiding M2M terminal device included in the service request message from the intelligent guiding M2M terminal device, build a new service request message according to the location information of the intelligent guiding M2M terminal device, send the new service request message to the intelligent guiding M2M application according to an application port number obtained by parsing the service request message sent from the intelligent guiding M2M terminal device;
   the intelligent guiding M2M application is further configured to search for corresponding guiding information locally according to the location information of the intelligent guiding M2M terminal device included in the received service request message, and return the corresponding guiding information to the intelligent guiding M2M platform via a service response message.

8. The intelligent guiding system based on an M2M system according to claim 7, wherein the intelligent guiding M2M terminal device is further configured to send a registration request message to the intelligent guiding M2M platform before sending the service request message;

the intelligent guiding M2M platform is further configured to, after authenticating and authorizing the intelligent guiding M2M terminal device according to a safety certificate and an identifier of the intelligent guiding M2M terminal device which are included in the registration request message, search for subscription information corresponding to the intelligent guiding M2M terminal device locally according to the identifier of the intelligent guiding M2M terminal device, and send an application port number included in the subscription information to the intelligent guiding M2M terminal device via a registration acknowledgement message.

9. The intelligent guiding system based on an M2M system according to claim 7, wherein the intelligent guiding M2M terminal device is further configured to execute, after receiving the guiding information sent from the intelligent guiding M2M platform, the guiding information through an information display/play device.

* * * * *